United States Patent
Chou et al.

(10) Patent No.: US 9,582,850 B2
(45) Date of Patent: Feb. 28, 2017

(54) APPARATUS AND METHOD THEREOF

(71) Applicant: Realtek Semiconductor Corp., Hsinchu (TW)

(72) Inventors: Yu-Pin Chou, Miao Li County (TW); Szu-Ping Chen, Chu Pei (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 15/164,953

(22) Filed: May 26, 2016

(65) Prior Publication Data
US 2016/0267625 A1 Sep. 15, 2016

Related U.S. Application Data

(63) Continuation of application No. 12/128,383, filed on May 28, 2008, now abandoned.
(Continued)

(51) Int. Cl.
*G06T 1/60* (2006.01)
*G09G 5/00* (2006.01)
(Continued)

(52) U.S. Cl.
CPC ............... *G06T 1/60* (2013.01); *G09G 3/28* (2013.01); *G09G 3/36* (2013.01); *G09G 5/005* (2013.01);
(Continued)

(58) Field of Classification Search
CPC ....... G09G 2340/04; G09G 2340/0407; G09G 2340/0414; G09G 2340/0421;
(Continued)

(56) References Cited

U.S. PATENT DOCUMENTS 5,874,937 A 2/1999 Kesatoshi
5,909,205 A 6/1999 Furuhashi et al.
(Continued)

FOREIGN PATENT DOCUMENTS

| EP | 1411490 A1 | 4/2004 |
|---|---|---|
| TW | I223828 | 8/2006 |
| TW | I270802 | 1/2007 |

OTHER PUBLICATIONS

TW application dated Aug. 23, 2012.
English abstract translation of TWI270802 (Published Jan. 11, 2007).
English abstract translation of TWI223828 (Published Aug. 22, 2006).

*Primary Examiner* — Grant Sitta
*Assistant Examiner* — Amen Bogale
(74) *Attorney, Agent, or Firm* — McClure, Qualey & Rodack, LLP

(57) ABSTRACT

An apparatus for mode detection for a display device includes a front-end circuit, adapted to fetch an image signal according to a determined mode to generate a fetched image signal, and to adjust the determined mode according to a control signal, and a back-end circuit, connected to the front-end circuit, adapted to process the fetched image signal according to the determined mode. The back-end circuit is adapted to generate an indication signal according to an abnormal status, wherein the back-end circuit comprises a buffer adapted to temporarily store the fetched image signal, and wherein the abnormal status comprises an underflow or overflow state of the buffer. The back-end circuit further includes a determining unit, connected to the front-end circuit and the back-end circuit, adapted to generate the control signal according to the indication signal indicating the determined mode needs to adjust.

12 Claims, 5 Drawing Sheets

Related U.S. Application Data

(60) Provisional application No. 60/940,445, filed on May 28, 2007.

(51) Int. Cl.
*G09G 3/28* (2013.01)
*G09G 3/36* (2006.01)

(52) U.S. Cl.
CPC . *G09G 2310/08* (2013.01); *G09G 2340/0414* (2013.01); *G09G 2340/0421* (2013.01)

(58) Field of Classification Search
CPC .. G09G 2340/0428; G09G 5/12; G09G 5/003; G09G 5/005; G09G 5/006; G09G 5/008; G09G 3/2096; G09G 5/227; G09G 5/391; G09G 2320/08; G06F 3/14; G06F 3/1415; H03L 7/06
See application file for complete search history.

(56) References Cited

U.S. PATENT DOCUMENTS

| | | |
|---|---|---|
| 6,140,881 A | 10/2000 | Kim |
| 6,304,297 B1* | 10/2001 | Swan .................... G06F 3/1415 345/501 |
| 6,348,931 B1 | 2/2002 | Suga et al. |
| 6,392,642 B1 | 5/2002 | Wu |
| 6,577,322 B1 | 6/2003 | Fukuda |
| 2003/0184532 A1 | 10/2003 | Chen et al. |
| 2005/0099437 A1 | 5/2005 | Kim et al. |
| 2006/0012552 A1 | 1/2006 | Chiu et al. |
| 2006/0077288 A1* | 4/2006 | Wu .......................... G06T 3/40 348/441 |
| 2006/0262809 A1 | 11/2006 | Gong et al. |
| 2007/0200836 A1 | 8/2007 | Jung |
| 2008/0219357 A1 | 9/2008 | Pao et al. |

* cited by examiner

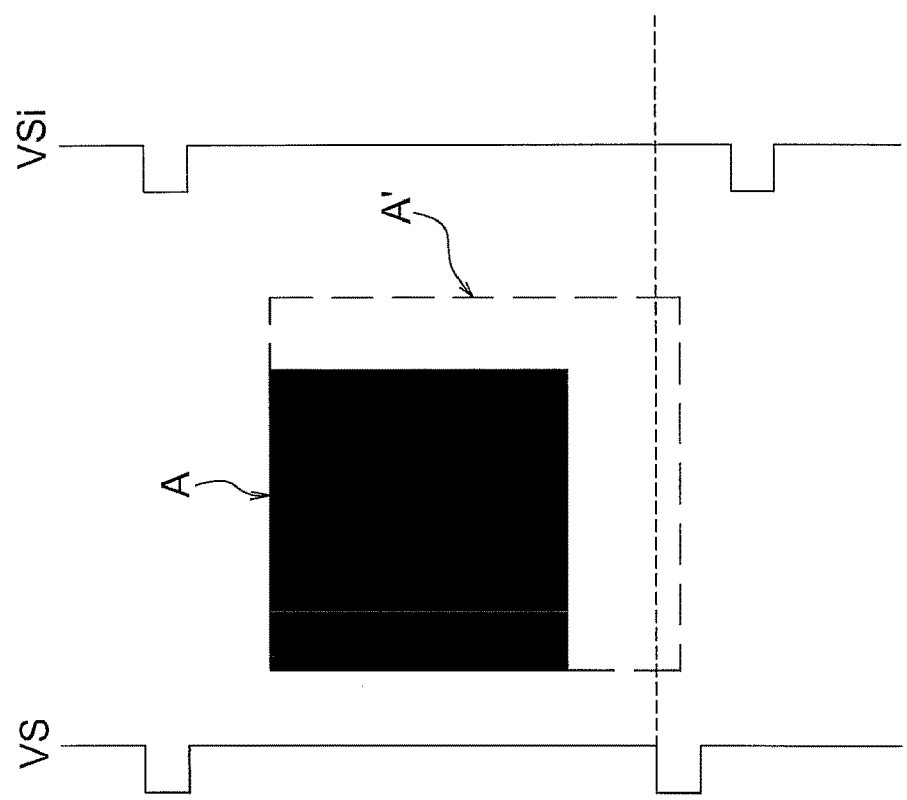

APPARATUS AND METHOD THEREOF

CROSS REFERENCE TO RELATED APPLICATIONS

This application is a continuation of application Ser. No. 12/128,383, filed May 28, 2008, which claims the benefit of U.S. Provisional application Ser. No. 60/940,445, filed May 28, 2007, the disclosures of which are incorporated herein by reference.

BACKGROUND OF THE INVENTION

Field of the Invention

The invention relates to display technology, particularly to a apparatus and a method thereof.

Description of the Related Art

At present, a digital display device, such as: liquid crystal display (LCD), plasma display panel (PDP), has gradually become the mainstream product in the market. And, in general, each of the panel has a native physical resolution. Furthermore, the resolution of an image signal outputted by a general video signal source, such as personal computer (PC), digital video disc/disk player (DVD Player), and so forth, may not be exactly equal to the native resolution of the panel. In other words, if a receiving circuit is applied in a LCD panel having 1280×1024 resolution, then the receiving circuit has to perform scaling up operation on the 640×480, 800×600, or 1024×768 image signal to match the native resolution of the panel of the digital display device.

BRIEF SUMMARY OF THE INVENTION

In light of the above mentioned problems, an object of the invention is to provide an apparatus and a method thereof. The detector and the method thereof can automatically detect the resolution of an input image and can adjust, such as scaling up or scaling down, the resolution of the input image when the resolution of the input image is not match to the native resolution of the panel so that the adjusted input image resolution is match to the native resolution of the flat panel display device. Then, correctly displaying the image on the display device can be achieved.

One embodiment of the invention provides an apparatus for mode detection for a display device. The apparatus comprises a front-end circuit, a back-end circuit and a determining unit. The front-end circuit is used for fetching an image signal according to a determined mode to generate a fetched image signal, and for adjusting the determined mode according to a control signal. The back-end circuit, coupled to the front-end circuit, is used for processing the fetched image signal according to the determined mode, and for generating an indication signal when the back-end circuit occurs an abnormal status. The determining unit, coupled to the front-end circuit and the back-end circuit, is used for generating the control signal according to the indication signal indicating the determined mode needs to adjust.

One embodiment of the invention provides a method for detection mode for a display device. The method comprises the following steps:

Receiving an image signal; selecting one of a plurality of modes to generate a determined mode; fetching the image signal according to the determined mode to produce a fetched image signal; processing the fetched image signal according to the determined mode to produce a processed image signal; generating an indication signal according to a state of the step of processing; and adjusting the determined mode according to the indication signal indicating the determined mode needs to adjust.

BRIEF DESCRIPTION OF THE DRAWINGS

FIG. 3 shows a schematic diagram illustrating the vertical synchronization signal and the outputting synchronization signal according to one embodiment of the invention.

DETAILED DESCRIPTION OF THE INVENTION

Generally, the image signals outputted from various video signal sources are generated according to a specific specification and each image according to a specific specification has a specific resolution. And in order to facilitate the receiving circuit of the display device to be able to detect the resolution of the image signal when inputting the image signal, it is necessary to perform mode detection on the image signal.

The format of the image signal further comprises other control signals besides the image data. For example, a general video or image signal further comprises data, horizontal synchronization signal (HS), vertical synchronization signal (VS), data enable signal (DEN), and so forth. Therefore, when performing the mode detection according to one embodiment of the invention, a measuring method can be used to obtain the relevant parameters of the image signal and thus which supporting mode (what kind of resolution) that the input image signal belongs to can be known or determined. And, the measuring method can measure the frequency, the period, the bandwidth, or the polarity of the synchronization signal HS or VS; or the total clock (CK) counts used by the overall synchronization signal.

It should be noted that, in the following discussion the embodiments of the invention is based on the flat panel display device, but with minor modifications, the technology of the invention is also applicable to various other display devices, such as curved surface display device, various possible forms of digital or analog display devices to be developed in future, or can even be applied in the display devices with variable physical resolution that may be developed in the future, without deviating from what is claimed for the invention.

Figure 1:
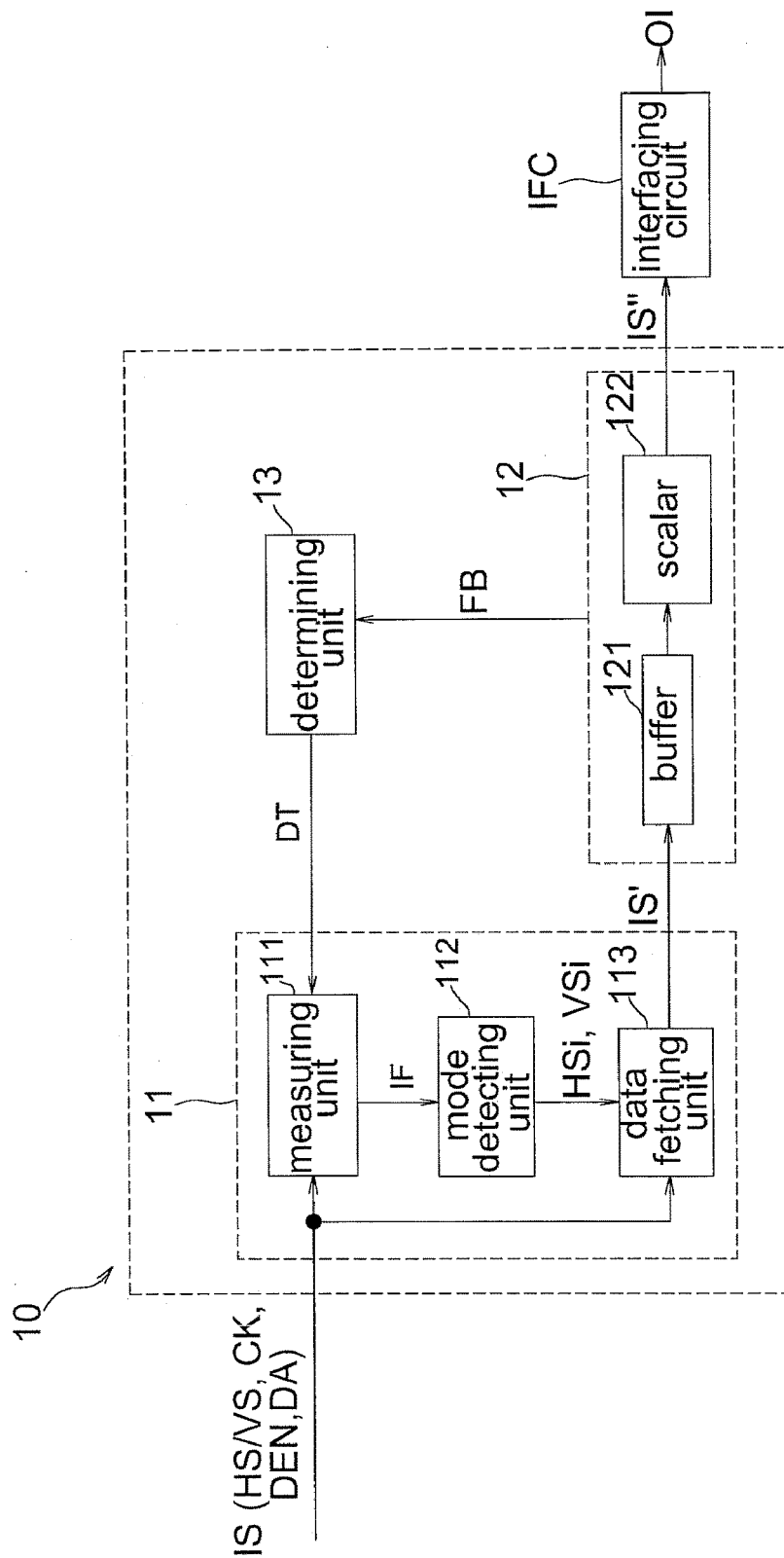
FIG. 1 shows a schematic diagram illustrating the apparatus according to one embodiment of the invention.

FIG. 1 shows an apparatus 10 for mode detection for a display device and an interfacing circuit (IFC) that is coupled to the display device according to one embodiment of the invention. The apparatus 10 may be applicable to a display device. The apparatus 10 is for detecting the resolution of an image signal (IS) outputted from the video signal source. The image signal (IS) can be a digital signal or an analog signal. As it is a digital signal, the image signal (IS) comprises a horizontal synchronization signal (HS), a vertical synchronization signal (VS), a clock signal (CK), a data enable signal (DEN), and image data (DA). As it is an analog signal, the image signal (IS) includes a horizontal synchronization signal (HS), a vertical synchronization signal (VS), a clock signal (CK), and image data (DA).

The apparatus 10 includes a front-end circuit 11, a back-end circuit 12, and a determining unit 13.

The front-end circuit 11 fetches the image signal (IS) according to a determined mode to generate a fetched image signal (IS'), and adjusts the determined mode according to a control signal DT. Further, the front-end circuit 11 measures the image signal (IS) to produce at least one parameter (IF), and selects one of a plurality of modes as the determined mode according to the at least one parameter (IF). Furthermore, the front-end circuit 11 can also reselect the proper mode or adjusts the vertical resolution or the horizontal resolution of the current mode according to the control signal (DT).

In one embodiment of the invention, the front-end circuit 11 comprises a measuring unit 111, a mode detecting unit 112, and a data fetching unit 113. The measuring unit 111 measures the horizontal synchronization signal (HS) or the vertical synchronization signal (VS), or the (HS) and the (VS) at the same time, to acquire the at least one parameter (IF).

The at least one parameter (IF) may comprise a start point of an active area of the image signal (IS), at least one of period of the synchronization signal, polarity of the synchronization signal, a frame width (Htotal) of the image signal, a frame height (Vtotal) of the image signal, or at least one of frequency, period, bandwidth, polarity, frame width, and a frame height, provided by the horizontal synchronization signal (HS) or the vertical synchronization signal (VS), or both of the (HS) and the (VS).

The mode detecting unit 112 selecting one of the plurality of the modes according to the at least one parameter (IF) generated by the measuring unit 111 to generate the determined mode. Thereafter, the mode detecting unit 112 generates a corresponding virtual (output) horizontal synchronization signal (HSi) and a corresponding virtual (output) vertical synchronization signal (VSi) according to the determined mode. Then, the data fetching unit 113 fetches the image signal (IS) according to the virtual (output) horizontal synchronization signal (HSi) and the virtual (output) vertical synchronization signal (VSi) to generate the fetched image signal (IS').

The back-end circuit 12, coupled to the front-end circuit 11, processes the fetched image signal (IS') generated from the data fetching unit 113 according to the determined mode, sets the fetched image signal (IS') to be properly scaled according to the current determined mode, and outputs a scaled and fetched image signal (IS") to the flat panel display device via the interface circuit (IFC). On the other hand, the back-end circuit 12 generates an indication signal (FB), when the back-end circuit 12 occurs an abnormal status. According to one embodiment of the invention, the back-end circuit 12 includes a buffer 121 and a scalar 122. The buffer 121 may be a line buffer. Of course, in another embodiment of the invention, the buffer 121 may be another current-existed or future-developed buffer. The buffer 121 temporarily stores the fetched image signal (IS'), which usually is the pixel data for performing scaling process, and the above-mentioned abnormal status comprises an underflow or overflow state of the buffer 121. The scalar 122 is for scaling the fetched image signal (IS') according to the scaling factor. The scaling factor is the ratio of the resolution determined in the determined mode to the native resolution of the panel of the display device.

The determining unit 13, coupled to the front-end circuit and the back-end circuit, receives the indication signal (FB), and generates the control signal (DT) to the front-end circuit 11 according to the indication signal (FB) indicating the determined mode needs to adjust (such as the result of determining if the scaled and fetched image signal (IS") can be correctly displayed) to maintain the current mode or to select another suitable mode. According to one embodiment of the invention, the control signal (DT) is inputted to the mode detecting unit 112 for assigning one of the pre-determined modes as the current mode or for changing the setting of the vertical resolution of the current mode.

Detail description of the operating method of the apparatus 10 according to one embodiment of the invention will be given in the followings. It is assumed that the native resolution of a panel is 1280×1024. And it is assumed that the mode supported by the front-end circuit 11 comprises a first mode (640×480), a second mode (800×600), a third mode (1024×768), a fourth mode (1280×1024), a fifth mode (1280×768), and a sixth mode (1366×768). It should be noted that the above-mentioned modes are commonly used modes, but the invention is not limited to the above-mentioned modes. The modes having other resolution levels can all be utilized in other embodiments.

Figure 2A:
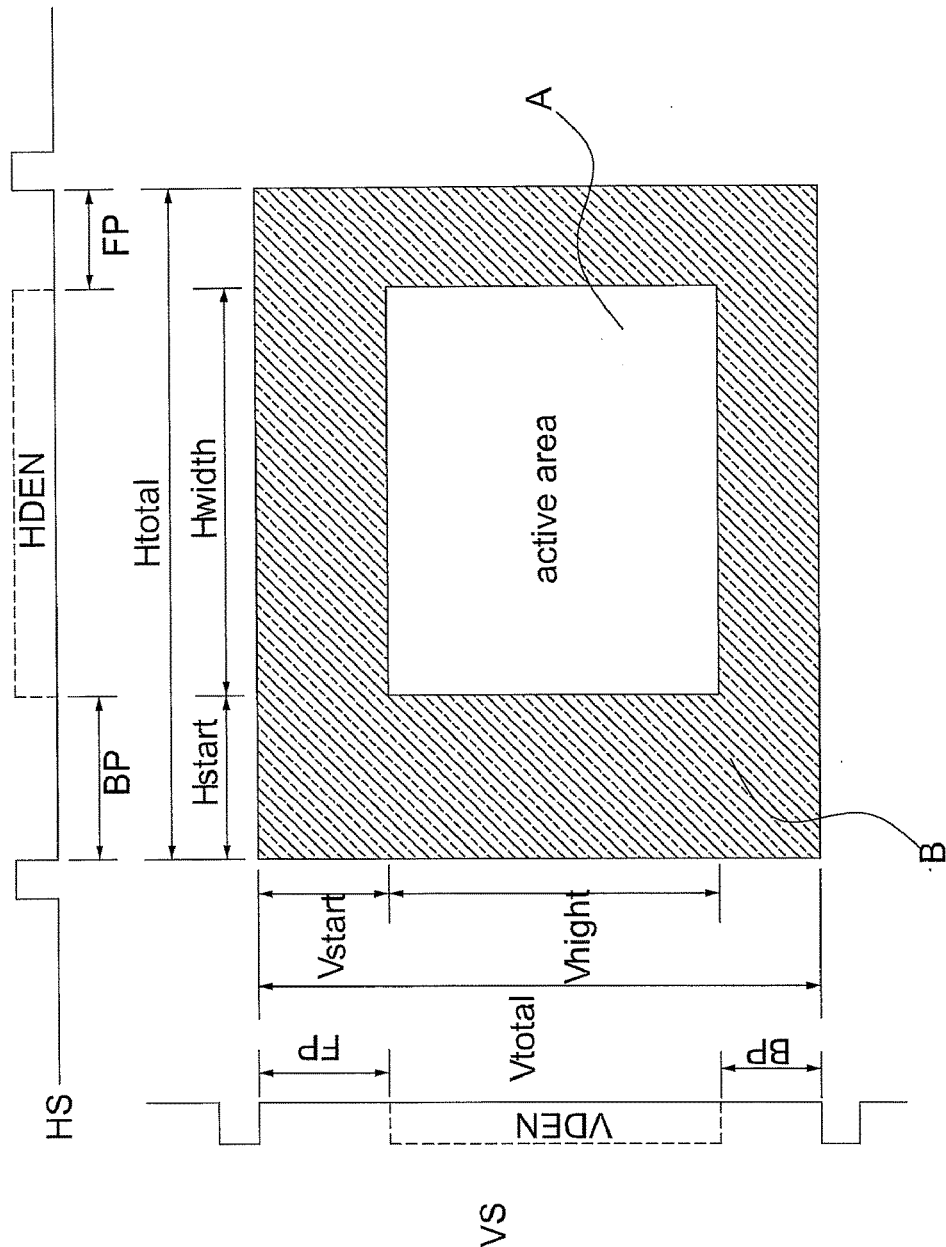
FIG. 2A shows a schematic diagram illustrating the relevant image attribute parameters of the frame of a digital image data.

FIG. 2A shows the image attribute parameters relevant to a frame of a digital image data of the image signal (IS). The frame comprises an active area (A) and a blank (or inactive) area (B). The parameters relevant to a frame comprise a frame width (Htotal), a frame height (Vtotal), a horizontal start point (Hstart) of the active area, a vertical start point (Vstart) of the active area, an active area width (Hwidth), and an active area height (Vhight). And the horizontal synchronization signal (HS) comprises a front porch (FP), a horizontal data enabling area ($H_{EN}$), and a back porch (BP). The meaning for each of the above-mentioned parameters can be understood by those who are skilled in the art and will not be repeated hereinafter.

Please refer to FIGS. 1 and 2A. At first, the video signal source outputs the image signal (IS) to the apparatus 10. Then, the measuring unit 111 of the apparatus 10 receives and measures the image signal (IS). For example, the measuring unit 111 measures the horizontal synchronization signal (HS) or the vertical synchronization signal (VS) of the image signal (IS) to derive the at least one parameter (IF) (pixel values, frequency, period, bandwidth, or polarity, etc.). Then, the measuring circuit 111 compares the parameter (IF) with a pre-determined value in a look-up-table (not shown in the figure) to derive a comparison result. For example, the measuring unit 111 may compare pixel values of the image signal (IS) with a predetermined value to determine a comparison result which is a start point of an active area of the image signal (IS). After that, according to the comparison result, the mode detecting unit 112 determines if the build-in modes can support the image signal (IS). For examples, the mode detecting unit 112 determines the image signal (IS) belongs to the second mode (800×600). Thus, the 800×600 resolution is utilized as the current determined mode. Therefore, according to the pre-determined horizontal and vertical resolution (800,600), the mode detecting unit 112 generates the corresponding virtual (output) horizontal and vertical synchronization signals (HSi, VSi). The data fetching unit 113 then receives the image signal (IS) according to HSi and VSi to generate the fetched image signal (IS').

According to one embodiment of the invention, the measuring unit 111 may measure at least one of period of the horizontal synchronization signal (HS) of the image signal (IS) only and determine the possible resolution of the image signal (IS) according to the period data of the horizontal synchronization signal (HS). Of course, by measuring more data (such as: the polarity of the horizontal synchronization signal (HS), the period of the vertical synchronization signal (VS), the polarity of the vertical synchronization signal (VS), and so forth), the determined resolution of the image signal (IS) can be more accurate. Once it is found that the determined resolution is not correct, another possible resolution can be set until the correct resolution is determined. In this embodiment of the invention, the measuring unit 111 may be implemented by a counter. The counter counts the interval between two horizontal synchronization signal (HS) pulses according to a clock (such as: a free-running clock, a pixel clock of the image signal (IS), or any clock selected from the internal clocks).

Figure 2B:
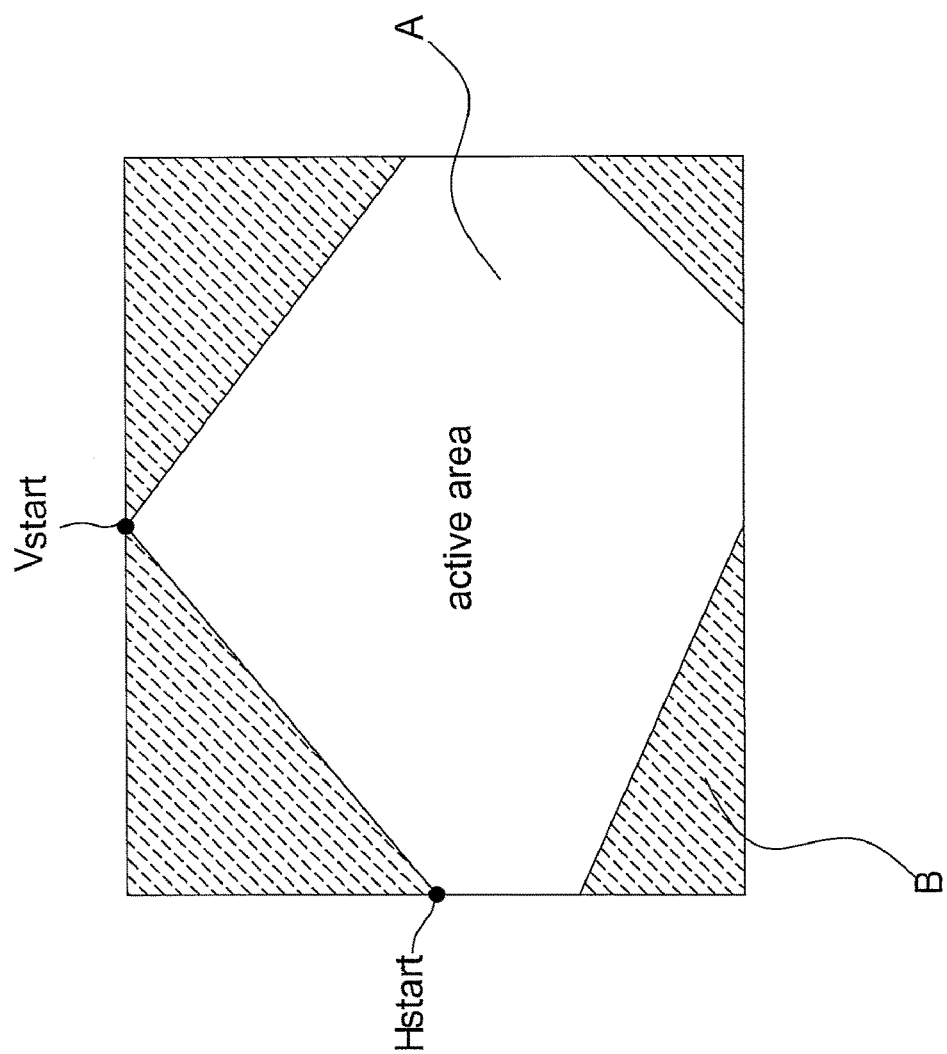
FIG. 2B shows a schematic diagram illustrating the frame of an analog image data.

It should be noted that the apparatus 10 has already detected the mode of the image signal (IS) according to the descriptions up to now. In another embodiment of the invention, in order to receive the image signal (IS) more accurately to have the display device display the image more precisely, the front-end circuit 11 can perform the measurement and processing of the start point of the active area of the frame of the image signal (IS), that is, the horizontal start point (Hstart) and the vertical start point (Vstart). For example, as the image signal (IS) is a digital signal, the measuring unit 111 determines a horizontal start point (Hstart) and/or a vertical start point (Vstart) of the active area of the frame of the image signal (IS) according to the data enable signal ($H_{DEN}$), so that the data fetching unit 113 may fetch the image signal (IS) according to the start point (Hstart and Vstart). As the image signal (IS) is an analog signal, the measuring unit 111 compares each pixel values of the image signal (IS) with a pre-determined value to determine a start point of an active area of the image signal, that is, a horizontal start point (Hstart) and a vertical start point (Vstart), and supplies to the data fetching unit 113 for fetching the image signal (IS). For example, in the analog image signal (IS) as shown in FIG. 2B, the comparison between the pixel and the pre-determined value can be determined by utilizing the pixel brightness value. It is assumed that the pixel brightness in the active area A is larger than the pre-determined value 16 and the pixel brightness in the blank area B is less than the pre-determined value 16. During operation, the measuring unit 111 scans each pixel of the frame of the image signal (IS), one by one from left to right and from top to down, and compares the brightness value of each pixel with the pre-determined value 16. Then, the position of the first pixel, having a brightness value larger than 16 and being closest to the top of the frame while scanning, is the vertical start point (Vstart) of the active area. The position of the first pixel, having a brightness value larger than 16 and being closest to the left of the frame while scanning, is the horizontal start point (Hstart) of the active area. Thus, the start point of the active area (A) of the frame can be found by such a method.

Description of the operation of the back-end circuit 12 and the determining unit 13 according to one embodiment of the invention, possible special situations, and the corresponding handling methods will be given in the followings.

At first, the buffer 121 receives and temporarily stores the fetched image signal (IS'). Since the native resolution of the panel is 1280×1024, the scalar 122 sets the fetched image signal (IS') according to the second mode (800×600) correspondingly by scaling up the fetched image signal (IS') properly to match the 1280×1024 resolution of the panel, and outputs the scaled and fetched image signal (IS") to the panel via the interface circuit (IFC) for displaying the image. It should be noted that, if the status of the above-mentioned fetched image signal (IS') is abnormal, such as: the resolution of the image signal (IS) determined by the system is 800×600 but the resolution of the image signal (IS) inputted is actually 640×480, the back-end circuit 12 will detect that the active area (A') of the determined 800×600 resolution surpasses the next vertical synchronization signal (VS) during the processing process, as shown in FIG. 3. In one embodiment of the invention, the data fetching unit 113 will stop fetching data when detecting the pulse of the next vertical synchronization signal (VS). Thereby, the buffer 121 does not contain sufficient image data and underflow phenomenon (A) will happen. Such an erroneous displaying phenomenon is an underflow phenomenon that happens when the determined vertical resolution is larger than the actual vertical resolution of the image signal.

At the same time, the back-end circuit 12 generates the indication signal (FB) to the determining unit 13 according to the above-mentioned underflow status. Then, the determining unit 13 generates a control signal (DT) to the measuring unit 111 according to the data provided in indication signal (FB) to have the mode detecting unit 112 adjust the current determined mode to the first mode (640×480) so that the data fetching unit 113 can correctly fetch the image signal (IS). In another embodiment of the invention, an approximate mode can be selected or the vertical resolution of the mode is modified directly for usage. Or, after learning the vertical resolution of the approximate mode (for example, if the line count of the vertical resolution is already known to be approximately 700 lines during the measuring process, the 1280×1024, 1366×768, 1280×768, 1024×768, and so forth, resolutions are incorrect, that is, those modes having the vertical resolution larger than 700 are incorrect), the incorrect modes can be excluded directly and the closer second mode (800×600) is searched directly so that the processing can be speeded up. If the underflow phenomenon still happens under the second mode (800×600), then it is learned that the 800×600 resolution is still incorrect and the next mode will be searched (that is, the first mode (640×480)) until the correct resolution is found.

Furthermore, if horizontal conflict happens in the apparatus 10 when determining the image signal resolution (for example, it is found that the vertical resolutions is 768 for either the 1280×768 or 1366×768 and it is unable to determine to use either the 1280×768 or 1366×768), then the measuring unit 111 can be utilized to directly measure the clock (CK) count required by the data enable area of the horizontal synchronization signal (HS). If the clock count is 1280, the 1280×768 mode is selected and vice versa.

Figure 4:
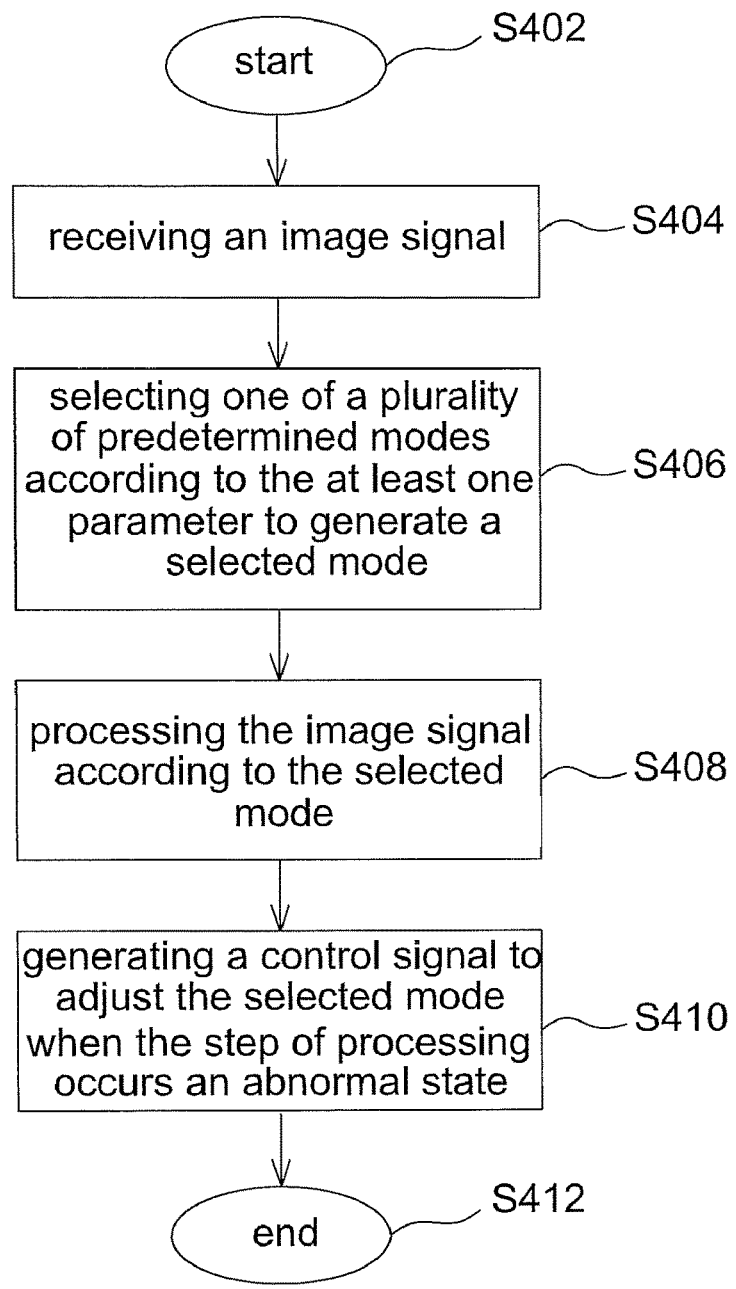
FIG. 4 shows a flow chart illustrating the method according to one embodiment of the invention.

FIG. 4 shows the flow chart of a method for detection mode for a display according to one embodiment of the invention. The method, applicable to a display device, comprises the following steps:

Step S402: start;

Step S404: receiving an image signal comprising an input horizontal synchronization signal and an input vertical synchronization signal;

Step S406: selecting one of a plurality of predetermined modes according to the at least one parameter to generate a selected (determined) mode, where the pre-determined modes may be predetermined or provided by a look-up-table or a hardware circuit or software according to the related information of the image signal;

Step S408: processing the image signal according to the selected mode; and

Step S410: generating a control signal to adjust the selected mode when the step of processing occurs an abnormal state, wherein the abnormal state may comprise an overflow or underflow phenomenon.

Please note that the image signal may further comprise a data enable signal and the method may further comprise the step of determining a horizontal start point (H-start) and a vertical start point (V-start) of the active area of a frame of the image data according to the data enable signal, wherein the at least one parameter comprises the horizontal start point (H-start) and the vertical start point (V-start). In one embodiment, the method may further comprise the step of determining a horizontal start point (H-start) and a vertical start point (V-start) of the active area of a frame of the image data. In another embodiment, the Step S408 may comprise the steps of temporarily storing image data of the image signal, and scaling the image data to generate a scaled image data according to the selected mode. In another embodiment, the method may further comprise a step of fetching the image signal according to the determined mode to produce a fetched image signal to be processed by the step 408. In another embodiment, the method may further comprise a step of generating an indication signal according to a state of the step of processing by the step 408. In another embodiment, the step S406 further comprises the step of measuring the image signal to produce at least one parameter; comparing the at least one parameter with a predetermined value; and selecting one of the plurality of the modes according to the comparison result.

In conclusion, the mode detector and the method thereof according to the invention are able to detect the resolution of the image signal automatically when inputting the image signal. Furthermore, because the embodiments of the invention use the back-end circuit to process feedback control, the apparatus and the method thereof can correctly determine the mode of the image signal (IS) without referencing the related information of the image signal (IS).

Although the description of the invention is by way of above-mentioned examples of embodiment, however, it should not be construed as any limitation on the scope of the invention. Various modifications or changes can be performed by those who are skilled in the art without deviating from the scope of the invention.

What is claimed is:

1. An apparatus for mode detection for a display device, comprising:
    a front-end circuit, adapted to fetch an image signal according to a determined mode to generate a fetched image signal, and to adjust the determined mode according to a control signal, wherein the determined mode is based on a horizontal or vertical pixel resolution of a frame of the fetched image; and
    a back-end circuit, connected to the front-end circuit, adapted to process the fetched image signal according to the determined mode;
    wherein,
    the back-end circuit being adapted to generate an indication signal according to an abnormal status, wherein the back-end circuit comprises a buffer adapted to temporarily store the fetched image signal, and wherein the abnormal status comprises an underflow or overflow state of the buffer; and
    the back-end circuit includes a determining circuit, connected to the front-end circuit and the back-end circuit, adapted to generate the control signal according to the indication signal indicating the determined mode needs to adjust, the back-end circuit further comprising a scalar adapted to scale a horizontal or vertical resolution of the fetched image signal according to the determined mode.

2. The apparatus according to claim 1, wherein the front-end circuit is adapted to measure the image signal to produce at least one parameter, and to select one of a plurality of modes as the determined mode according to the at least one parameter.

3. The apparatus according to claim 1, wherein the front-end circuit comprises:
    a measuring circuit, adapted to measure a synchronization signal of the image signal to acquire the at least one parameter;
    a mode detecting circuit, adapted to select one of the plurality of the modes according to the at least one parameter to generate the determined mode, and to generate a corresponding output horizontal synchronization signal and a corresponding output vertical synchronization signal according to the determined mode; and
    a data fetching circuit, adapted to fetch the image signal according to the output horizontal synchronization signal and the output vertical synchronization signal to generate the fetched image signal.

4. The apparatus according to claim 3, wherein the measuring circuit is adapted to determine a start point of an active area of the image signal, the at least one parameter comprises the start point, and the data fetching circuit is adapted to fetch the image signal according to a start point.

5. The apparatus according to claim 3, wherein the measuring circuit is adapted to compare pixel values of the image signal with a predetermined value to determine a start point of an active area of the image signal.

6. The apparatus according to claim 3, wherein the image signal comprises a data enable signal, and the measuring circuit is adapted to determine a start point of an active area of the image signal according to the data enable signal.

7. The apparatus according to claim 6, wherein the start point comprises a horizontal start point and a vertical start point.

8. The apparatus according to claim 2, wherein the at least one parameter comprises at least one of period of the synchronization signal, frame width of the image signal, a frame height of the image signal, and a start point of the active area of the image signal.

9. The apparatus according to claim 1, wherein the front-end circuit is adapted to adjust the determined mode according to the control signal to prevent an underflow or overflow state of the buffer.

10. A method of mode detection for a display device, comprising:
    receiving an image signal;
    selecting one of a plurality of modes to generate a determined mode, wherein the determined mode is based on a horizontal or vertical pixel resolution of a frame of the received image;
    fetching the image signal according to the determined mode to produce a fetched image signal; and
    processing the fetched image signal according to the determined mode to produce a processed image signal;
    wherein the processing further comprises:
    temporarily storing the fetched image signal in a buffer;
    generating an indication signal according to an abnormal status of the step of processing, wherein the indication signal is generated when an overflow or underflow state occurs in the buffer;

adjusting the determined mode according to the indication signal indicating the determined mode needs to adjust; and scaling a horizontal or vertical resolution of the fetched image signal according to the determined mode.

11. The method according to claim 10, wherein the step of selecting comprises:

measuring the image signal to produce at least one parameter;

comparing the at least one parameter with a predetermined value; and selecting one of the plurality of the modes according to the comparison result.

12. The method according to claim 11, wherein the at least one parameter comprises at least one of period of the synchronization signal, frame width of the image signal, a frame height of the image signal, and a start point of the active area of the image signal.

* * * * *